United States Patent
Zhang

(10) Patent No.: US 12,181,703 B2
(45) Date of Patent: Dec. 31, 2024

(54) DISPLAY DEVICE WITH LIGHT SOURCES AND DISPLAY METHOD THEREOF

(71) Applicant: WUHAN CHINA STAR OPTOELECTRONICS TECHNOLOGY CO., LTD., Hubei (CN)

(72) Inventor: Peng Zhang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 190 days.

(21) Appl. No.: 17/780,034

(22) PCT Filed: May 18, 2022

(86) PCT No.: PCT/CN2022/093595
§ 371 (c)(1),
(2) Date: May 26, 2022

(87) PCT Pub. No.: WO2023/201819
PCT Pub. Date: Oct. 26, 2023

(65) Prior Publication Data
US 2023/0341610 A1    Oct. 26, 2023

(30) Foreign Application Priority Data
Apr. 20, 2022 (CN) .......................... 202210416986.5

(51) Int. Cl.
F21V 8/00 (2006.01)
G02F 1/1335 (2006.01)

(52) U.S. Cl.
CPC ......... *G02B 6/0055* (2013.01); *G02B 6/0021* (2013.01); *G02B 6/0025* (2013.01); *G02B 6/0068* (2013.01); *G02F 1/133514* (2013.01)

(58) Field of Classification Search
CPC .......................... G02F 1/133615; G02F 1/1336
See application file for complete search history.

(56) References Cited

U.S. PATENT DOCUMENTS

2006/0007369 A1*  1/2006  Jin ...................... G02F 1/13336
                                                        349/58
2016/0245979 A1   8/2016  Park
(Continued)

FOREIGN PATENT DOCUMENTS

CN        110568649 A    12/2019
CN        110618559 A    12/2019
(Continued)

OTHER PUBLICATIONS

Chinese Office Action issued in corresponding Chinese Patent Application No. 202210416986.5 dated Apr. 27, 2023, pp. 1-7.
(Continued)

*Primary Examiner* — Lauren Nguyen
(74) *Attorney, Agent, or Firm* — Rivka Friedman

(57) ABSTRACT

A display device has a main display area and a function-adding area and includes a backlight module and a display panel. The backlight module includes an optical film set and light sources. The light sources are disposed on at least one end of the optical film set that is perpendicular to a light-emitting side of the backlight module, and include first light groups and second light groups. When the display device is in a functional mode, the first light groups are turned off, the second light groups are turned on, a first dark zone is formed on the optical film set, and the function-adding area is located within the first dark zone.

17 Claims, 6 Drawing Sheets

(56) References Cited

U.S. PATENT DOCUMENTS

| | | | |
|---|---|---|---|
| 2018/0120494 A1* | 5/2018 | Yoo | G02B 6/0091 |
| 2019/0004374 A1 | 1/2019 | Chang | |
| 2020/0116917 A1* | 4/2020 | Lee | G02B 6/0073 |

FOREIGN PATENT DOCUMENTS

| | | | | |
|---|---|---|---|---|
| CN | 110632789 A | | 12/2019 | |
| CN | 11-0646984 | * | 1/2020 | G02F 1/13357 |
| CN | 110646984 A | | 1/2020 | |
| CN | 110955084 A | | 4/2020 | |
| CN | 111176018 A | | 5/2020 | |
| CN | 111505850 A | | 8/2020 | |
| CN | 11-1711768 | * | 9/2020 | H04N 5/235 |
| CN | 111711768 A | | 9/2020 | |
| CN | 111752039 A | | 10/2020 | |
| CN | 112241088 A | | 1/2021 | |
| CN | 112346270 A | | 2/2021 | |
| CN | 113031345 A | | 6/2021 | |
| CN | 113031346 A | | 6/2021 | |
| CN | 113296314 A | | 8/2021 | |
| CN | 113391479 A | | 9/2021 | |
| CN | 113467123 A | | 10/2021 | |
| CN | 113744641 A | | 12/2021 | |
| CN | 114114751 A | | 3/2022 | |
| KR | 20180128783 A | | 12/2018 | |

OTHER PUBLICATIONS

International Search Report in International application No. PCT/CN2022/093595, mailed on Dec. 5, 2022.

Written Opinion of the International Search Authority in International application No. PCT/CN2022/093595, mailed on Dec. 5, 2022.

Chinese Office Action issued in corresponding Chinese Patent Application No. 202210416986.5 dated Jan. 10, 2023, pp. 1-6.

* cited by examiner

Providing a display device, wherein, the display device has a main display area and a function-adding area and includes a backlight module and a display panel disposed on a light-emitting side of the backlight module, the backlight module includes an optical film set and light sources, the optical film set includes at least one optical film, the light sources are disposed on at least one end of the optical film set that is perpendicular to the light-emitting side of the backlight module, and the light sources include first light groups and second light groups. — S1

Entering a functional mode, controlling the first light groups to be turned off, controlling the second light groups to be turned on, and forming a first dark zone on the optical film set, wherein, the function-adding area is located within the first dark zone. — S2

FIG. 7

DISPLAY DEVICE WITH LIGHT SOURCES AND DISPLAY METHOD THEREOF

FIELD OF INVENTION

The present disclosure relates to the field of display technologies, and more particularly, to a display device and a display method thereof.

BACKGROUND OF INVENTION

With development of liquid crystal display technologies, especially development of full-screen technologies, backlight modules of display devices having in-plane perforation structures for an application of function-adding areas (such as camera placement areas) have been launched to the markets. However, light from backlight sources of the backlight modules entering holes will affect effects of additional functions (such as photo-taking effects), causing light leakage in the function-adding areas. Therefore, it is necessary to improve this defect.

Technical problem: an embodiment of the present disclosure provides a display device to prevent the light from the backlight sources of the backlight modules from entering the function-adding areas, thereby solving the technical problems of light leakage in the function-adding areas.

SUMMARY OF INVENTION

An embodiment of the present disclosure provides a display device, which has a main display area and a function-adding area and includes a backlight module and a display panel disposed on a light-emitting side of the backlight module. The backlight module includes an optical film set and a plurality of light sources. The optical film set includes at least one optical film. The light sources are disposed on at least one end of the optical film set that is perpendicular to the light-emitting side of the backlight module, and the light sources include first light groups and second light groups. Wherein, when the display device is in a functional mode, the first light groups are turned off, the second light groups are turned on, a first dark zone is formed on the optical film set, and the function-adding area is located within the first dark zone.

In the display device provided in an embodiment of the present disclosure, the first light groups and the second light groups are disposed at a same end of the optical film set, and the second light groups are arranged on both sides of the first light groups.

In the display device provided in an embodiment of the present disclosure, a light-emitting angle of the second light groups is greater than or equal to 90 degrees and is less than or equal to 120 degrees.

In the display device provided in an embodiment of the present disclosure, light-emitting angles of the second light groups arranged on the both sides of the first light groups are symmetrical about the function-adding area.

In the display device provided in an embodiment of the present disclosure, a light-emitting angle of the first light groups is greater than a light-emitting angle of the second light groups.

In the display device provided in an embodiment of the present disclosure, the light sources include third light groups, and the third light groups and the first light groups are disposed at two different ends of the optical film set, respectively.

In the display device provided in an embodiment of the present disclosure, the first light groups and the second light groups are disposed at a same end of the optical film set, the function-adding area is disposed at an intersection of two borders of the display device, the first light groups are disposed adjacent to the function-adding area, and the second light groups are disposed on one side of the first light groups.

In the display device provided in an embodiment of the present disclosure, a light-emitting angle of the first light groups is greater than a light-emitting angle of the second light groups.

In the display device provided in an embodiment of the present disclosure, the light sources include third light groups, and the third light groups and the first light groups are disposed at two different ends of the optical film set, respectively.

In the display device provided in an embodiment of the present disclosure, the first light groups and the second light groups are disposed at a same end of the optical film set, and the first light groups and the second light groups are arranged alternately.

In the display device provided in an embodiment of the present disclosure, a spacing between the first light groups and the second light groups adjacent to each other is gradually reduced along a direction away from the function-adding area.

In the display device provided in an embodiment of the present disclosure, the light sources include third light groups, and the third light groups and the first light groups are disposed at two different ends of the optical film set, respectively.

In the display device provided in an embodiment of the present disclosure, the display panel includes an array substrate, a color filter substrate, and a liquid crystal layer, the liquid crystal layer is disposed between the array substrate and the color filter substrate, and the liquid crystal layer includes a plurality of liquid crystal molecules; and when the display device is in the functional mode, a second dark zone is formed on the display panel, an orthographic projection of the first dark zone on the display panel is within the second dark zone, the liquid crystal molecules in the second dark zone are in a non-light-transmitting state, and the liquid crystal molecules in the function-adding area are in a light-transmitting state.

In the display device provided in an embodiment of the present disclosure, the display device further includes a supplementary light source disposed in the function-adding area, the supplementary light source is disposed on one side of the backlight module away from the display panel, and when the display device is in the functional mode, the supplementary light source is turned on.

In the display device provided in an embodiment of the present disclosure, the at least one optical film includes a light guide plate, and an area of the light guide plate corresponding to the function-adding area is formed with a through-hole.

In the display device provided in an embodiment of the present disclosure, the at least one optical film further includes a reflective film, a diffusion film, and a brightness enhancement film, the reflective film is disposed on one side of the light guide plate away from the display panel, the diffusion film is disposed between the light guide plate and the display panel, and the brightness enhancement film is disposed between the diffusion film and the display panel; and areas of the reflective film, the diffusion film, and the brightness enhancement film corresponding to the function-adding area are all formed with the through-hole.

In the display device provided in an embodiment of the present disclosure, the at least one optical film includes a light guide plate, and a surface roughness of the light guide plate in the function-adding area is less than a surface roughness of the light guide plate in the main display area.

In the display device provided in an embodiment of the present disclosure, the at least one optical film further includes a reflective film, a diffusion film, and a brightness enhancement film, the reflective film is disposed on one side of the light guide plate away from the display panel, the diffusion film is disposed between the light guide plate and the display panel, and the brightness enhancement film is disposed between the diffusion film and the display panel; and areas of the reflective film, the diffusion film, and the brightness enhancement film corresponding to the function-adding area are all formed with a through-hole.

An embodiment of the present disclosure further provides a display method of a display device. The method includes following steps: providing a display device, wherein, the display device has a main display area and a function-adding area and includes a backlight module and a display panel disposed on a light-emitting side of the backlight module, the backlight module includes an optical film set and light sources, the optical film set includes at least one optical film, the light sources are disposed on at least one end of the optical film set that is perpendicular to the light-emitting side of the backlight module, and the light sources include first light groups and second light groups; and entering a functional mode, controlling the first light groups to be turned off, controlling the second light groups to be turned on, and forming a first dark zone on the optical film set, wherein, the function-adding area is located within the first dark zone.

In the display method of the display device provided in an embodiment of the present disclosure, the step of entering the functional mode further includes controlling a second dark zone to be formed on the display panel, wherein, an orthographic projection of the first dark zone on the display panel is within the second dark zone.

Beneficial effect: the embodiment of the present disclosure provides the display device, which has the main display area and the function-adding area and includes the backlight module and the display panel disposed on the light-emitting side of the backlight module. The backlight module includes the optical film set and the light sources. The optical film set includes at least one optical film. The light sources are disposed on at least one end of the optical film set that is perpendicular to the light-emitting side of the backlight module, and include the first light groups and the second light groups. When the display device is in the functional mode, the first light groups are turned off, the second light groups are turned on, the first dark zone is formed on the optical film set, and the function-adding area is located within the first dark zone. In the present disclosure, by dividing the light sources into the first light groups and the second light groups, when the display device is in the functional mode, the first light groups are turned off, thereby allowing the first dark zone to be formed on the optical film set. Since the function-adding area is located within the first dark zone, light can be prevented from entering the function-adding area. Therefore, the function-adding area can have excellent anti-light leakage performances, thereby improving effects of additional functions.

DESCRIPTION OF DRAWINGS

The accompanying figures to be used in the description of embodiments of the present disclosure will be described in brief to more clearly illustrate the technical solutions of the embodiments.

FIG. 7 is a flowchart of a display method of the display device according to an embodiment of the present disclosure.

DETAILED DESCRIPTION OF PREFERRED EMBODIMENTS

Figure 1:
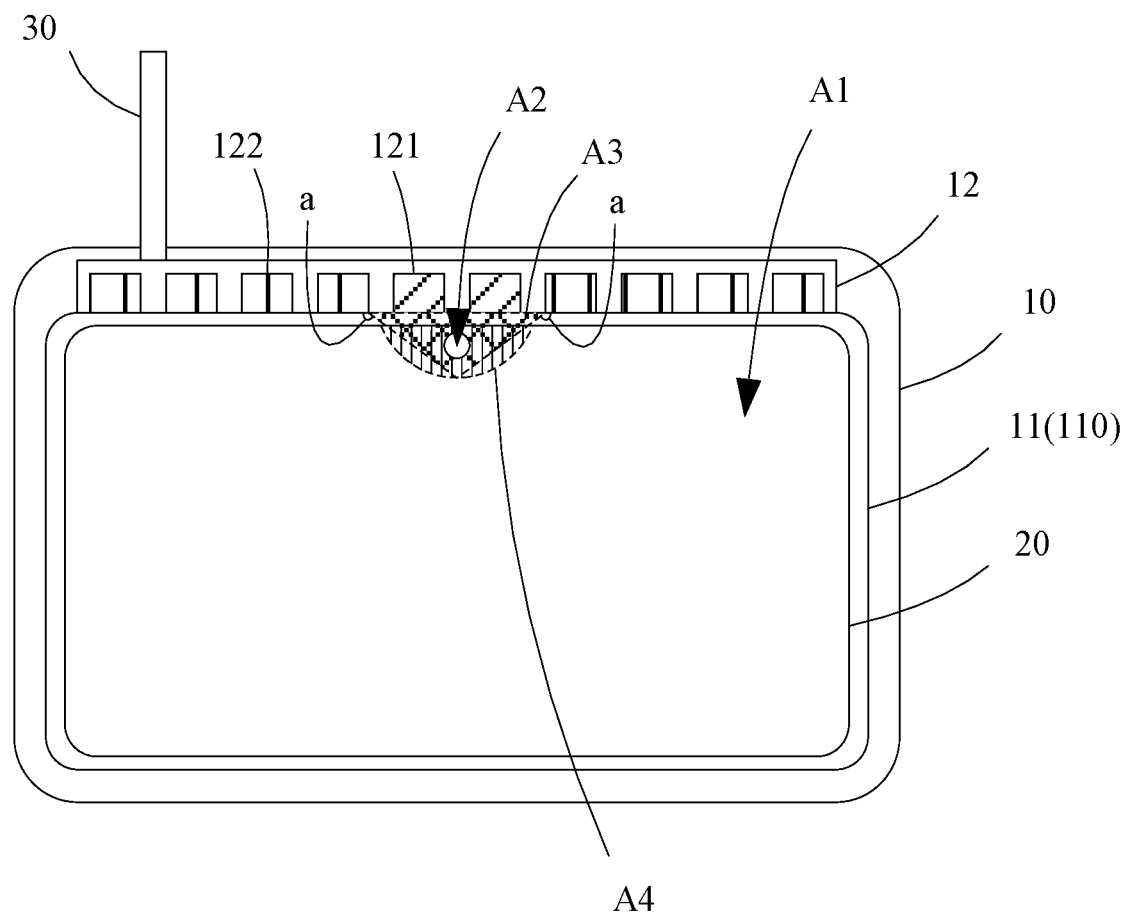
FIG. 1 is a schematic top view of a display device according to an embodiment of the present disclosure.

The technical solutions in the embodiments of the present disclosure will be clearly and completely described below with reference to the drawings in the embodiments of the present disclosure. In the drawings, for clarity and ease of understanding and description, the sizes and thicknesses of the components shown in the drawings are not to scale.

As shown in FIG. 1, FIG. 1 is a schematic top view of a display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 and second light groups 122. Wherein, when the display device is in a functional mode, the first light groups 121 are turned off, the second light groups 122 are turned on, a first dark zone A3 is formed on the optical film set 11, and the function-adding area A2 is located within the first dark zone A3.

It should be noted that the function-adding area A2 refers to a disposition area for additional functions of the display device other than a display function, such as a photo-taking function. When the display device is in a display mode, the function-adding area A2 displays normally, and when the display device is in the functional mode (such as a shooting mode), the function-adding area A2 is used to realize a certain function, such as a sending and receiving channel of ambient light for an under-screen camera.

It can be understood that in current technology, light from backlight sources of backlight modules will enter the function-adding area and affect effects of the function-adding area, for example, affecting shooting quality, causing light leakage in the function-adding area. In the present disclosure, by dividing the light sources 12 of the backlight module 10 into the first light groups 121 and the second light groups 122, when the display device is in the functional mode, the first light groups 121 are turned off, thereby allowing the first dark zone A3 to be formed on the optical film set 11. Since the function-adding area A2 is located within the first dark zone A3, light can be prevented from entering the function-adding area A2. Therefore, the function-adding area A2 can have excellent anti-light leakage performances, thereby improving effects of additional functions.

In an embodiment, the first light groups 121 and the second light groups 122 are disposed at a same end of the optical film set 11, and the second light groups 122 are arranged on both sides of the first light groups 121.

It should be noted that a principle of forming the first dark zone A3 is that FIG. 1 is taken as an example for description, when the first light groups 121 are turned off and the second light groups 122 are turned on, in a direction perpendicular to a thickness of the optical film set 11, since light-emitting surfaces of the second light groups 122 are fan-shaped, edges of the light-emitting surfaces of the second light groups 122 adjacent to both sides of the first light groups 121 will meet at a vertex. Since the edges of the light-emitting surfaces at the vertex surrounds an area of the optical film set 11 to be no light, the first dark zone A3 is formed. Since the function-adding area A2 is located within the first dark zone A3, after turning off the first light groups 121, light from the light sources 12 will not enter the function-adding area A2. Therefore, the function-adding area A2 can have excellent anti-light leakage performances, thereby improving the effects of additional functions, such as improving phototaking quality.

In an embodiment, a light-emitting angle a of the second light groups 122 is greater than or equal to 90 degrees and is less than or equal to 120 degrees.

In an embodiment, light-emitting angles a of the second light groups 122 arranged on the both sides of the first light groups 121 are symmetrical about the function-adding area A2.

It can be understood that in this embodiment, by setting the light-emitting angles a of the second light groups 122 adjacent to the both sides of the first light groups 121 to be symmetrical about the function-adding area A2, the function-adding area A2 can be positioned in a central area of the first dark zone A3. Therefore, an area of the function-adding area A2 may be further increased without worrying that the first dark zone A3 cannot cover the function-adding area A2, and disposing the function-adding area A2 in the central area of the first dark zone A3 can further improve the anti-light leakage performances.

In an embodiment, a light-emitting angle of the first light groups 121 is greater than the light-emitting angle of the second light groups 122.

It can be understood that in this embodiment, by setting the light-emitting angle of the second light groups 122 to be smaller than the light-emitting angle of the first light groups 121, in the direction perpendicular to the thickness of the optical film set 11, the vertex where the edges of the light-emitting surfaces of the second light groups 122 adjacent to the both sides of the first light groups 121 meet will be farther from the first light groups 121. Therefore, an area of the first dark zone A3 can be increased, allowing an area size or a disposed position of the function-adding area A2 to be more flexible.

In an embodiment, when the display device is in the functional mode, a second dark zone A4 is formed on the display panel 20, and an orthographic projection of the first dark zone A3 on the display panel 20 is within the second dark zone A4.

It can be understood that when the display device is in the functional mode, in this embodiment, by forming the second dark zone A4 on the display panel 20 and setting the orthographic projection of the first dark zone A3 on the display panel 20 to be within the second dark zone A4, when the first light groups 121 are in a process of being turned on to off, that is, the first dark zone A3 is in a process of transitioning from light to dark, the second dark zone A4 can shield this transition to prevent users from mistaking screens for poor display. Therefore, the present disclosure can further improve display effect and provide users with better use experiences.

It should be noted that in FIG. 1, only the function-adding area A2 and the light sources 12 both located on an upper border of the display device is taken as an example for illustration. Specifically, the light sources 12 and the function-adding area A2 are located near a same border, thereby facilitating the first light groups 121 of the light sources 12 to control the brightness in the function-adding area A2. The light sources 12 and the function-adding area A2 are not limited to the position of the upper border, they can be set on any one of four borders. In addition, the light sources 12 may also be set on multiple borders, respectively. only a design principle that a border near the function-adding area A2 is provided with the light sources 12 needs to be followed.

It should be noted that in FIG. 1, only two first light groups 121 disposed adjacent to the function-adding area A2 is taken as an example for illustration. Specifically, a number of the first light groups 121 is greater than or equal to 1. A specific number of the first light groups 121 and a number of light sources (not shown in the figures) in one first light group 121 are determined, according to, in the direction perpendicular to the thickness of the optical film set 11, the area of the function-adding area A2, a distance between the function-adding area A2 and the border, and the light-emitting angles of the first light groups 121 and the second light groups 122.

Specifically, a size of the light-emitting angle of the second light groups 122 determines a size of the first dark zone A3. Under other conditions being the same, if the light-emitting angle of the second light groups 122 is larger, the area of the first dark zone A3 formed will be smaller, and if the light-emitting angle of the second light groups 122 is smaller, the area of the first dark zone A3 formed will be larger. That is, the area of the first dark zone A3 can be adjusted by adjusting the light-emitting angle of the second light groups 122. In addition, the first dark zone A3 needs to cover the function-adding area A2, that is, the size of the first dark zone A3 needs to be determined according to the area of the function-adding area A2 and the distance between the function-adding area A2 and the border. A setting area of the first light groups 121 needs to be determined according to the area size of the first dark zone A3. After the setting area of the first light groups 121 is determined, if the light-emitting angle of the first light groups 121 is larger, the number of the first light groups 121 that needs to be disposed is smaller, and if the light-emitting angle of the first light groups 121 is smaller, the number of the first light groups 121 that needs to be disposed is larger. Therefore, the specific number of the first light groups 121 and the number of light sources (not shown in the figures) in one first light group 121 are determined, according to, in the direction perpendicular to the thickness of the optical film set 11, the area of the function-adding area A2, the distance between the function-adding area A2 and the border, and the light-emitting angles of the first light groups 121 and the second light groups 122.

In an embodiment, the display device further includes a flexible circuit board 30, one end of the flexible circuit board 30 is electrically connected to the light sources 12, and another end of the flexible circuit board 30 is electrically connected to a driving chip (not shown in the figures), and the light sources 12 are independently controlled in groups by the driving chip through the flexible circuit board 30. In the display mode, all the light groups of the light sources 12 are controlled to be in a light-emitting state. In the functional mode, the light groups above the function-adding area A2 (that is, the first light groups 121) are controlled to be turned off, thereby allowing the first dark zone A3 to be formed on the optical film set 11 and allowing the function-adding area A2 to be located in the first dark zone A3, thereby preventing the light from entering the function-adding area A2. Therefore, the function-adding area A2 can have excellent anti-light leakage performances, thereby improving the effects of additional functions, such as improving photo-taking quality.

Figure 2:
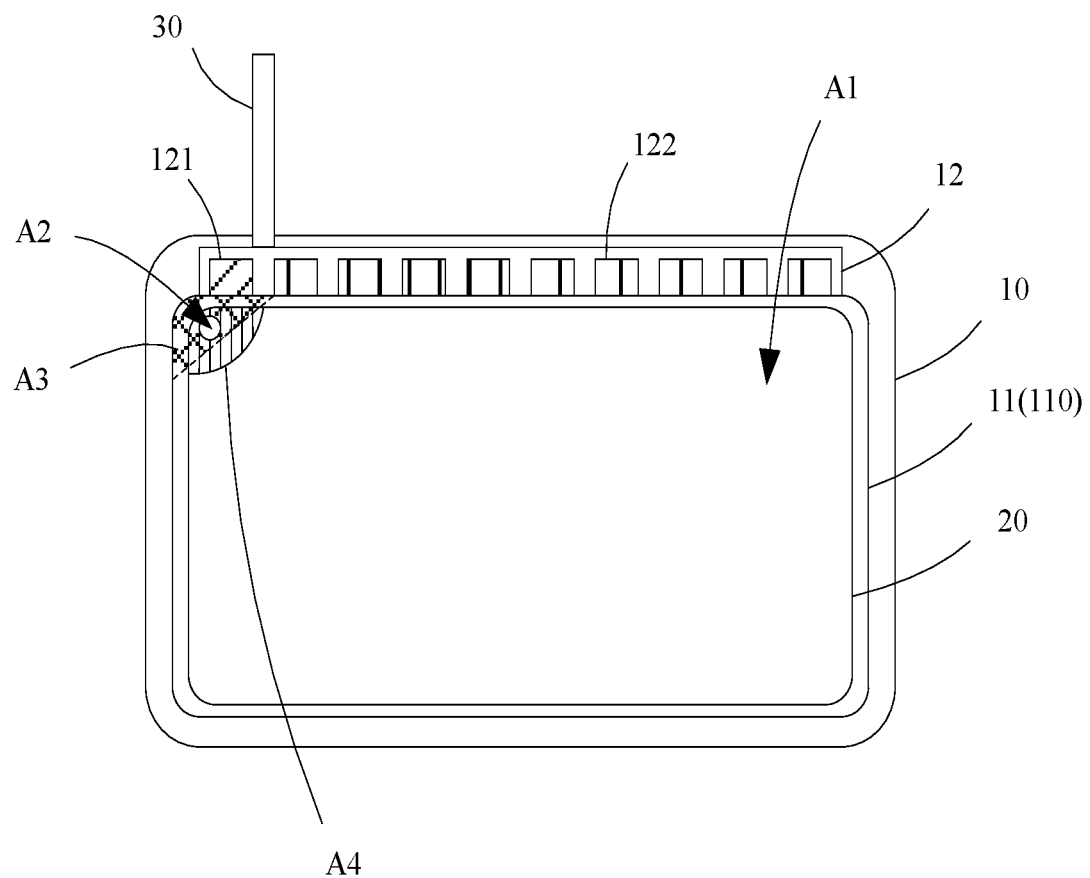
FIG. 2 is a schematic top view of another display device according to an embodiment of the present disclosure.

Referring to FIG. 2, FIG. 2 is a schematic top view of another display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 and second light groups 122. Wherein, when the display device is in a functional mode, the first light groups 121 are turned off, the second light groups 122 are turned on, a first dark zone A3 is formed on the optical film set 11, and the function-adding area A2 is located within the first dark zone A3.

In this embodiment, the first light groups 121 and the second light groups 122 are disposed at a same end of the optical film set 11, the function-adding area A2 is disposed at an intersection of two borders of the display device, the first light groups 121 are disposed adjacent to the function-adding area A2, and the second light groups 122 are disposed on one side of the first light groups 121.

It can be understood that a difference from the display device shown in FIG. 1 is that in this embodiment, the function-adding area A2 is disposed at the intersection of the two borders of the display device. Correspondingly, the first light groups 121 are disposed at one end of the light sources 12, and the second light groups 122 are disposed on one side of the first light groups 121, while the second light groups 122 in FIG. 1 are disposed on the both sides of the first light groups 121.

It should be noted that in FIG. 2, the light sources 12 including only one first light group 121 is taken as an example for illustration. Specifically, a number of the first light group 121 is greater than or equal to 1. A specific number of the first light groups 121 and a number of light sources (not shown in the figures) in one first light group 121 are determined, according to, in the direction perpendicular to the thickness of the optical film set 11, the area of the function-adding area A2, a distance between the function-adding area A2 and the border, and the light-emitting angles of the first light groups 121 and the second light groups 122.

In an embodiment, the light-emitting angle of the first light group 121 is greater than the light-emitting angle of the second light groups 122.

It can be understood that in this embodiment, by setting the light-emitting angle of the second light groups 122 to be smaller than the light-emitting angle of the first light group 121, in the direction perpendicular to the thickness of the optical film set 11, an intersection point where an edge of a light-emitting surface of the second light groups 122 adjacent to the first light group 121 intersects with an edge of the optical film set 11 is farther from the first light group 121. Therefore, an area of the first dark zone A3 can be increased, allowing an area size or a disposed position of the function-adding area A2 to be more flexible.

In an embodiment, when the display device is in the functional mode, a second dark zone A4 is formed on the display panel 20, and an orthographic projection of the first dark zone A3 on the display panel 20 is within the second dark zone A4.

It can be understood that when the display device is in the functional mode, in this embodiment, by forming the second dark zone A4 on the display panel 20 and setting the orthographic projection of the first dark zone A3 on the display panel 20 to be within the second dark zone A4, when the first light groups 121 are in a process of being turned on to off, that is, the first dark zone A3 is in a process of transitioning from light to dark, the second dark zone A4 can shield this transition to prevent users from mistaking screens for poor display. Therefore, the present disclosure can further improve display effect and provide users with better use experiences.

Figure 3:
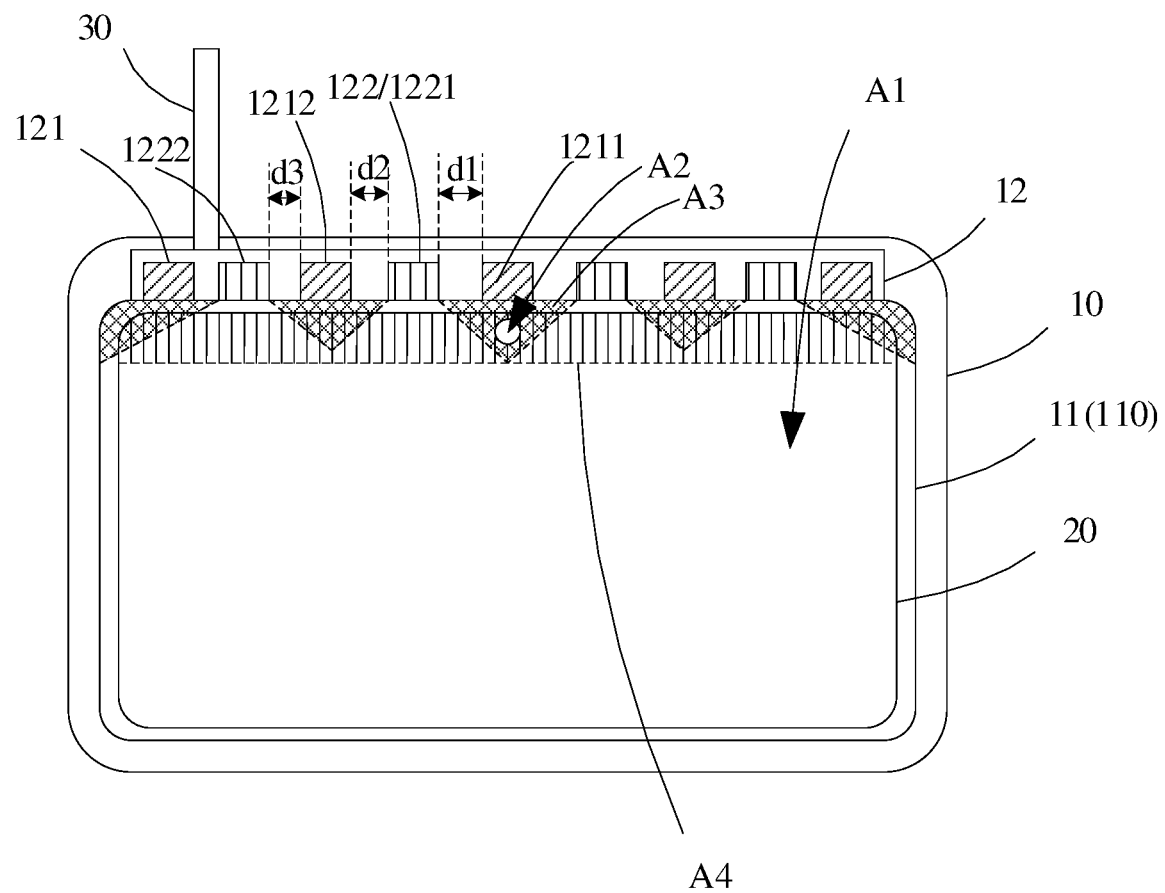
FIG. 3 is a schematic top view of yet another display device according to an embodiment of the present disclosure.

Referring to FIG. 3, FIG. 3 is a schematic top view of yet another display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 and second light groups 122. Wherein, when the display device is in a functional mode, the first light groups 121 are turned off, the second light groups 122 are turned on, a first dark zone A3 is formed on the optical film set 11, and the function-adding area A2 is located within the first dark zone A3.

In this embodiment, the first light groups 121 and the second light groups 122 are disposed at a same end of the optical film set 11, and the first light groups 121 and the second light groups 122 are arranged alternately.

It can be understood that in this embodiment, by arranging the first light groups 121 and the second light groups 122 alternately, all light groups of the light sources 12 can be uniformly controlled, thereby improving the brightness uniformity of the light sources 12.

In an embodiment, when the display device is in the functional mode, a second dark zone A4 is formed on the display panel 20, and an orthographic projection of the first dark zone A3 on the display panel 20 is within the second dark zone A4.

It can be understood that when the display device is in the functional mode, in this embodiment, by forming the second dark zone A4 on the display panel 20 and setting the orthographic projection of the first dark zone A3 on the display panel 20 to be within the second dark zone A4, when the first light groups 121 are in a process of being turned on to off, that is, the first dark zone A3 is in a process of transitioning from light to dark, the second dark zone A4 can shield this transition to prevent users from mistaking screens for poor display. Therefore, the present disclosure can further improve display effect and provide users with better use experiences.

In an embodiment, a spacing between the first light groups 121 and the second light groups 122 adjacent to each other is gradually reduced along a direction away from the function-adding area A2. As shown in FIG. 3, the first light group 1211, the second light group 1221, the first light group 1212, and the second light group 1222 are arranged in sequence in the direction away from the function-adding area A2. d1 refers to a spacing between the first light group 1211 and the second light group 1221, d2 refers to a spacing between the second light group 1221 and first light group 1212, and d3 refers to a spacing between the first light group 1212 and second light group 1222. d2 is less than d1, and d3 is less than d2.

It can be understood that when a spacing between one first light group 121 and one second light group 122 is reduced, that is, when a spacing between two adjacent second light groups 122 is reduced, an area of the orthographic projection of the first dark zone A3 formed between the two adjacent second light groups 122 on the display panel 20 is reduced. Therefore, when a height of the second dark zone A4 in the direction perpendicular to the light-emitting side of the backlight module 10 is larger than a height of the orthographic projection of the first dark zone A3 (where the function-adding area A2 is located) on the display panel 20, the second dark zone A4 can also cover other first dark zones A3 where the function-adding area A2 is not disposed. Therefore, the second dark zone A4 can shield the transition of the first dark zone A3 in a process of transitioning from light to dark, thereby preventing users from mistaking screens for poor display. Therefore, the present disclosure can further improve display effect and provide users with better use experiences.

Figure 4:
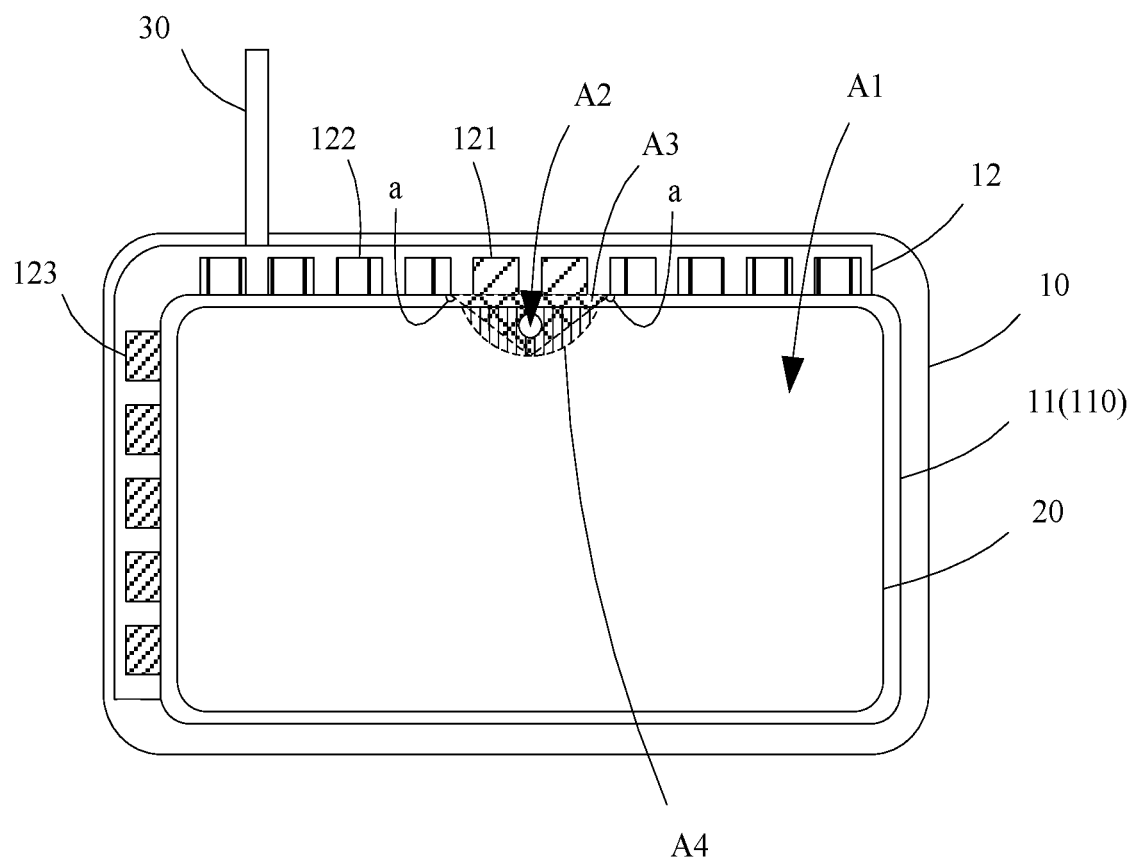
FIG. 4 is a schematic top view of still another display device according to an embodiment of the present disclosure.

Referring to FIG. 4, FIG. 4 is a schematic top view of still another display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 and second light groups 122. Wherein, when the display device is in a functional mode, the first light groups 121 are turned off, the second light groups 122 are turned on, a first dark zone A3 is formed on the optical film set 11, and the function-adding area A2 is located within the first dark zone A3.

In this embodiment, the light sources 12 include third light groups 123, and the third light groups 123 and the first light groups 121 are disposed at two different ends of the optical film set 11, respectively.

It can be understood that in this embodiment, the light sources 12 are respectively arranged on multiple borders of the display device, and the first light groups 121 and the function-adding area A2 are located near a same border, thereby facilitating the first light groups 121 to control the brightness in the function-adding area A2.

Figure 5:
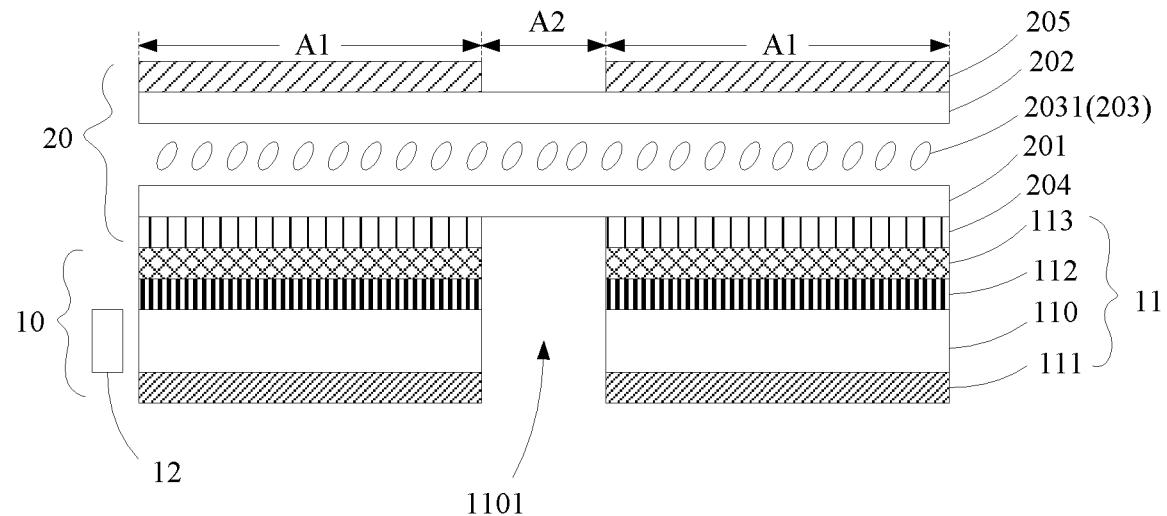
FIG. 5 is a schematic cross-sectional diagram of the display device according to an embodiment of the present disclosure.

Referring to FIG. 5, FIG. 5 is a schematic cross-sectional diagram of the display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 (as shown in FIG. 1) and second light groups 122 (as shown in FIG. 1). Wherein, when the display device is in a functional mode, the first light groups 121 are turned off, the second light groups 122 are turned on, a first dark zone A3 (as shown in FIG. 1) is formed on the optical film set 11, and the function-adding area A2 is located within the first dark zone A3.

In this embodiment, the display panel 20 includes an array substrate 201, a color filter substrate 202, and a liquid crystal layer 203, the liquid crystal layer 203 is disposed between the array substrate 201 and the color filter substrate 202, and the liquid crystal layer 203 includes a plurality of liquid crystal molecules 2031. Wherein, when the display device is in the functional mode, a second dark zone A4 (as shown in FIG. 1) is formed on the display panel 20, an orthographic projection of the first dark zone A3 on the display panel 20 is within the second dark zone A4, the liquid crystal molecules 2031 in the second dark zone A4 are in a non-light-transmitting state, and the liquid crystal molecules 2031 in the function-adding area A2 are in a light-transmitting state.

It can be understood that in the present disclosure, by controlling deflected angles of the liquid crystal molecules 2031, the second dark zone A4 (as shown in FIG. 1) can be controlled to form on the display panel 20. By forming the second dark zone A4 on the display panel 20, the first dark zone A3 (as shown in FIG. 1) on the backlight module 10 can be shielded, thereby shielding the first dark zone A3 transitioning from light to dark, thereby preventing users from mistaking screens for poor display. Therefore, the present disclosure can further improve display effect and provide users with better use experiences. In addition, by controlling the liquid crystal molecules 2031 in the function-adding area A2 to be in the light-transmitting state, light is allowed to pass through, thereby realizing the effect of additional functions, such as a sending and receiving channel of ambient light for a camera.

Wherein, in the display mode, all liquid crystal molecules 2031 in the liquid crystal layer 203 deflect normally, and the display device display normally. In the functional mode, for example, in the shooting mode, the liquid crystal molecules 2031 in the second dark zone A4 (as shown in FIG. 1) are controlled to be in the non-light-transmitting state, thereby shielding the first dark zone A3 (as shown in FIG. 1) on the backlight module 10, and the liquid crystal molecules 2031 in the function-adding area A2 are controlled to be in the light-transmitting state, thereby realizing the effect of additional functions, such as photo-taking.

In an embodiment, the display device further includes a supplementary light source (not shown in the figures) disposed in the function-adding area A2, the supplementary light source is disposed on one side of the backlight module 10 away from the display panel 20, and when the display device is in the functional mode, the supplementary light source is turned on.

It can be understood that when the display device is in the functional mode, there is no light in the function-adding area A2. In this embodiment, by disposing the supplementary light source in the function-adding area A2, the effect of additional functions of the function-adding area A2 can be improved, for example, the supplementary light source is used as a flash to improve the photo-taking effect.

In an embodiment, the display panel 20 further includes a lower polarizer 204 disposed on one side of the array substrate 201 facing the backlight module 10 and an upper polarizer 205 disposed on one side of the color filter substrate 202 away from the array substrate 201.

In other embodiments, the display panel 20 may also be an organic light-emitting diode (OLED) display panel, a micro-LED display panel, or a mini-LED display panel.

In an embodiment, an area of the light guide plate 110 corresponding to the function-adding area A2 is formed with a through-hole 1101.

It can be understood that in this embodiment, by forming the through-hole 1101 in the area of the light guide plate 110 corresponding to the function-adding area A2, the light transmittance in the function-adding area A2 can be improved, thereby improving the effect of the additional functions in the function-adding area A2, for example, improving the photo-taking effect.

In an embodiment, the at least one optical film further includes a reflective film 111, a diffusion film 112, and a brightness enhancement film 113, the reflective film 111 is disposed on one side of the light guide plate 110 away from the display panel 20, the diffusion film 112 is disposed between the light guide plate 110 and the display panel 20, and the brightness enhancement film 113 is disposed between the diffusion film 112 and the display panel 20. Wherein, areas of the reflective film 111, the diffusion film 112, and the brightness enhancement film 113 corresponding to the function-adding area A2 are all formed with a through-hole.

It can be understood that in this embodiment, by forming the through-hole in the areas of the reflective film 111, the diffusion film 112, and the brightness enhancement film 113 corresponding to the function-adding area A2, the light transmittance in the function-adding area A2 can be improved, thereby satisfying the requirement of the additional functions in the function-adding area A2.

Figure 6:
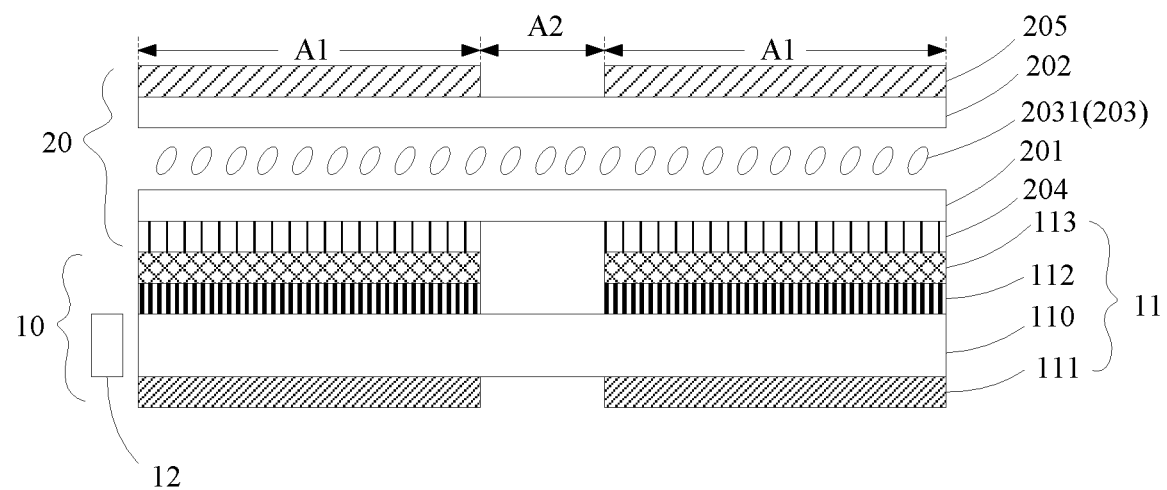
FIG. 6 is a schematic cross-sectional diagram of another display device according to an embodiment of the present disclosure.

Referring to FIG. 6, FIG. 6 is a schematic cross-sectional diagram of another display device according to an embodiment of the present disclosure. The display device has a main display area A1 and a function-adding area A2 and includes a backlight module 10 and a display panel 20 disposed on a light-emitting side of the backlight module 10. The backlight module 10 includes an optical film set 11 and a plurality of light sources 12. The optical film set 11 includes at least one optical film, and the at least one optical film includes a light guide plate 110. The light sources 12 are disposed on at least one end of the optical film set 11 that is perpendicular to the light-emitting side of the backlight module 10, and the light sources 12 include first light groups 121 (as shown in FIG. 1) and second light groups 122 (as shown in FIG. 1). Wherein, when the display device is in a functional mode, the first light groups 121 are turned off, the second light groups 122 are turned on, a first dark zone A3 (as shown in FIG. 1) is formed on the optical film set 11, and the function-adding area A2 is located within the first dark zone A3.

In this embodiment, a surface roughness of the light guide plate 110 in the function-adding area A2 is less than a surface roughness of the light guide plate 110 in the main display area A1.

It should be noted that the light guide plate 110 is a transparent material. A difference from FIG. 5 is that in this embodiment, the light guide plate 110 does not do punching. This is because if the through-hole 1101 is formed (as shown in FIG. 5), a brightness in the through-hole 1101 will be brighter than that in areas without punching, thereby affecting the display effect. In addition, inner sides of the through-hole 1101 need to be further polished uniformly, causing the process to be complicated and the cost to be high. Therefore, there is no punching in this embodiment, light on overall light guide plate 110 can be more uniform, and the display effect is better. In addition, in this embodiment, upper and lower surfaces of the light guide plate 110 in the function-adding area A2 are smoother by bright-polishing the area of the light guide plate 110 corresponding to the function-adding area A2. That is, the surface roughness of the light guide plate 110 in the function-adding area A2 is less than the surface roughness of the light guide plate 110 in the main display area A1, which is beneficial to improve the effect of the additional functions of the function-adding area A2, for example, improving the photo-taking quality.

In other embodiments, microstructures may also be formed on the light guide plate 110 in the function-adding area A2, which can improve a viewing angle and taste in the function-adding area A2 to a certain extent. However, it is necessary to meet the premise of the additional functions. In addition, the effect of the additional functions may also be optimized by hardware and software.

Referring to FIG. 7, FIG. 7 is a flowchart of a display method of the display device according to an embodiment of the present disclosure. The display method of the display device includes following steps.

S1: providing the display device, wherein the display device has the main display area and the function-adding area and includes the backlight module and the display panel disposed on the light-emitting side of the backlight module, the backlight module includes the optical film set and the light sources, the optical film set includes at least one optical film, the light sources are disposed on at least one end of the optical film set that is perpendicular to the light-emitting side of the backlight module, and the light sources include the first light groups and the second light groups; and S2: entering the functional mode, controlling the first light groups to be turned off, controlling the second light groups to be turned on, and forming the first dark zone on the optical film set. Wherein, the function-adding area is located within the first dark zone.

It can be understood that in this embodiment, when the display device enters the functional mode, the first light groups are controlled to be turned off, thereby allowing the first dark zone to be formed on the optical film set and preventing light from entering the function-adding area. Therefore, the function-adding area can have excellent anti-light leakage performances, thereby improving the effect of additional functions.

In an embodiment, the step S2 further includes controlling the second dark zone to be formed on the display panel, wherein, an orthographic projection of the first dark zone on the display panel is within the second dark zone.

It can be understood that when the display device enters the functional mode, in this embodiment, by controlling the second dark zone to be formed on the display panel and setting the orthographic projection of the first dark zone on the display panel to be within the second dark zone, when the first light groups are in a process of being turned on to off, that is, the first dark zone is in a process of transitioning from light to dark, the second dark zone can shield this transition to prevent users from mistaking screens for poor display. Therefore, the present disclosure can further improve display effect and provide users with better use experiences.

It should be noted that the display device provided in the embodiments of the present disclosure may be a product or component having a display function, such as a mobile phone, a tablet computer, a notebook computer, a television, a digital camera, a navigator, etc.

In summary, the embodiments of the present disclosure provide the display device, which has the main display area and the function-adding area and includes the backlight module and the display panel disposed on the light-emitting side of the backlight module. The backlight module includes the optical film set and the light sources. The optical film set includes at least one optical film. The light sources are disposed on at least one end of the optical film set that is perpendicular to the light-emitting side of the backlight module, and include the first light groups and the second light groups. When the display device is in the functional mode, the first light groups are turned off, the second light groups are turned on, the first dark zone is formed on the optical film set, and the function-adding area is located within the first dark zone. In the present disclosure, by dividing the light sources into the first light groups and the second light groups, when the display device is in the functional mode, the first light groups are turned off, thereby allowing the first dark zone to be formed on the optical film set. Since the function-adding area is located within the first dark zone, light can be prevented from entering the function-adding area. Therefore, the function-adding area can have excellent anti-light leakage performances, thereby improving the effect of additional functions. The embodiments of the present disclosure prevent the light from backlight sources of the backlight module from entering the function-adding area, thereby solving the technical problems of light leakage in the function-adding area.

The display device and the display method thereof provided in the embodiments of the present disclosure are described in detail above. The disclosure herein provides many different embodiments or examples for realizing different structures of the present disclosure, and it is understood that they are only examples and are not intended to limit the present disclosure.

What is claimed is:

1. A display device, having a main display area and a function-adding area and comprising a backlight module and a display panel disposed on a light-emitting side of the backlight module, and the function-adding area is configured for sending and receiving channel of ambient light for an under-screen camera, wherein the backlight module comprises:
    an optical film set comprising at least one optical film; and
    a plurality of light sources disposed on at least one end of the optical film set that is perpendicular to the light-emitting side of the backlight module, wherein the light sources comprise first light groups and second light groups;
    wherein edges of light-emitting surfaces of the second light groups adjacent to both sides of the first light groups meet at a vertex, an area of the optical film set surrounded by the edges of the light-emitting surfaces is defined as a first dark zone, and the function-adding area is located within the first dark zone; each of the first light groups is disposed between every adjacent two of the second light groups; a spacing is defined between each of the first light groups and one of the second light groups adjacent to the each of the first light groups, the spacing gradually decreases along a direction away from the function-adding area;
    a light-emitting angle of the second light groups is greater than or equal to 90 degrees and is less than or equal to 120 degrees, and a light-emitting angle of the first light groups is greater than the light-emitting angle of the second light groups.

2. The display device according to claim 1, wherein the first light groups and the second light groups are disposed at a same end of the optical film set, and the second light groups are arranged on both sides of the first light groups.

3. The display device according to claim 1, wherein light-emitting angles of the second light groups arranged on the both sides of the first light groups are symmetrical about the function-adding area.

4. The display device according to claim 2, wherein the light sources comprise third light groups, and the third light groups and the first light groups are disposed at two different ends of the optical film set, respectively.

5. The display device according to claim 1, wherein the first light groups and the second light groups are disposed at a same end of the optical film set, the function-adding area is disposed at an intersection of two borders of the display device, the first light groups are disposed adjacent to the function-adding area, and the second light groups are disposed on one side of the first light groups.

6. The display device according to claim 5, wherein a light-emitting angle of the first light groups is greater than a light-emitting angle of the second light groups.

7. The display device according to claim 5, wherein the light sources comprise third light groups, and the third light groups and the first light groups are disposed at two different ends of the optical film set, respectively.

8. The display device according to claim 1, wherein the first light groups and the second light groups are disposed at a same end of the optical film set.

9. The display device according to claim 8, wherein the light sources comprise third light groups, and the third light groups and the first light groups are disposed at two different ends of the optical film set, respectively.

10. The display device according to claim 1, wherein the display panel comprises an array substrate, a color filter substrate, and a liquid crystal layer, the liquid crystal layer is disposed between the array substrate and the color filter substrate, and the liquid crystal layer comprises a plurality of liquid crystal molecules; and
    wherein a second dark zone is formed on the display panel, an orthographic projection of the first dark zone on the display panel is within the second dark zone, the liquid crystal molecules in the second dark zone are in a non-light-transmitting state, and the liquid crystal molecules in the function-adding area are in a light-transmitting state.

11. The display device according to claim 10, further comprising a supplementary light source disposed in the function-adding area, wherein the supplementary light source is disposed on one side of the backlight module away from the display panel.

12. The display device according to claim 1, wherein the at least one optical film comprises a light guide plate, and an area of the light guide plate corresponding to the function-adding area is formed with a through-hole.

13. The display device according to claim 12, wherein the at least one optical film further comprises a reflective film, a diffusion film, and a brightness enhancement film, the reflective film is disposed on one side of the light guide plate away from the display panel, the diffusion film is disposed between the light guide plate and the display panel, and the brightness enhancement film is disposed between the diffusion film and the display panel; and areas of the reflective film, the diffusion film, and the brightness enhancement film corresponding to the function-adding area are all formed with the through-hole.

14. The display device according to claim 1, wherein the at least one optical film comprises a light guide plate, and a surface roughness of the light guide plate in the function-adding area is less than a surface roughness of the light guide plate in the main display area.

15. The display device according to claim 14, wherein the at least one optical film further comprises a reflective film, a diffusion film, and a brightness enhancement film, the reflective film is disposed on one side of the light guide plate away from the display panel, the diffusion film is disposed between the light guide plate and the display panel, and the brightness enhancement film is disposed between the diffusion film and the display panel; and areas of the reflective film, the diffusion film, and the brightness enhancement film corresponding to the function-adding area are all formed with a through-hole.

16. A display method of a display device, comprising following steps:

providing a display device, wherein the display device has a main display area and a function-adding area and comprises a backlight module and a display panel disposed on a light-emitting side of the backlight module, the function-adding area is configured for sending and receiving channel of ambient light for an under-screen camera, the backlight module comprises an optical film set and light sources, the optical film set comprises at least one optical film, the light sources are disposed on at least one end of the optical film set that is perpendicular to the light-emitting side of the backlight module, and the light sources comprise first light groups and second light groups; each of the first light groups is disposed between every adjacent two of the second light groups; a spacing is defined between each of the first light groups and one of the second light groups adjacent to the each of the first light groups, the spacing gradually decreases along a direction away from the function-adding area; and entering a functional mode, controlling the first light groups to be turned off, controlling the second light groups to be turned on, and forming a first dark zone on the optical film set, wherein the function-adding area is located within the first dark zone; edges of light-emitting surfaces of the second light groups adjacent to both sides of the first light groups meet at a vertex, an area of the optical film set surrounded by the edges of the light-emitting surfaces is defined as the first dark zone; a light-emitting angle of the second light groups is greater than or equal to 90 degrees and is less than or equal to 120 degrees, and a light-emitting angle of the first light groups is greater than the light-emitting angle of the second light groups.

17. The display method of the display device according to claim 16, wherein the step of entering the functional mode further comprises:

controlling a second dark zone to be formed on the display panel, wherein an orthographic projection of the first dark zone on the display panel is within the second dark zone.

\* \* \* \* \*